March 23, 1965 J. P. VAN DUYNE 3,175,170
MODULATOR CIRCUITS
Filed June 1, 1962 2 Sheets-Sheet 1

INVENTOR
JOHN P. VAN DUYNE
BY J. I. Chapman
ATTORNEY

March 23, 1965 J. P. VAN DUYNE 3,175,170

MODULATOR CIRCUITS

Filed June 1, 1962 2 Sheets-Sheet 2

INVENTOR
JOHN P. VAN DUYNE
BY J. C. Chapman
ATTORNEY 3,175,170
MODULATOR CIRCUITS John P. Van Duyne, Cedar Grove, N.J., assignor, by mesne assignments, to Hewlett-Packard Company, a corporation of California Filed June 1, 1962, Ser. No. 199,346
7 Claims. (Cl. 332—44)

This invention relates to signal modulators and more particularly to modulators of the double-sideband suppressed-carrier type.

Balanced modulators are required in certain applications to produce output signals in which the frequencies of both the applied signal and carried signal are cancelled leaving predominant signals at the sum and difference frequencies of the applied and carrier signals. Modulators of this type are called double-balanced modulators and are generally used on double-ended signals. When the applied signal is single-ended, push-pull transformers or phase inverting circuits are generally required to provide signals in phase opposition for driving the modulator. These driving circuits are generally not suitable for broadband applications because of the frequency limitations of the transformer and because of the added complexity and concomitant expense of phase inverting circuits. One known scheme for providing broadband operation on single-ended signals is to connect the carrier signal to the grid of the first tube and to the cathode of the second tube and to connect the applied signal to the cathode of the first tube and to the grid of the second tube of a difference amplifying circuit. Circuits of this type are described in the literature. (See: Harold T. McAleer, "Mixer Circuit Has Clean Output," Electronic Industries, October 1960, pages 76–77.) One disadvantage inherent in circuits of this type is that the second harmonics of each of the carrier and applied signals add in phase and thus are not cancelled in the output. It is usually possible to filter out the undesired second harmonic of the carrier signal. However, in broadband applications where the frequency of the applied or baseband signal is closely related to the frequency of the carrier signal, it becomes difficult to filter out the undesired second harmonics of the applied signal because they fall within the desired spectrum of the modulated suppressed carrier.

Accordingly, it is an object of the present invention to provide a double-sideband suppressed-carrier modulator in which the second harmonics of the applied signal are removed from the output.

It is another object of the present invention to provide an improved modulator which cancels out the undesirable second harmonics of the applied signal and which operates over a broad band of frequencies.

In accordance with the illustrated embodiment of the present invention the second harmonic of the applied or base band signal frequency is cancelled from the output signal which is produced by combining the outputs of two similar modulators. The first modulators generates the desired sidebands by means of the second order coefficient of the power series representing the non-linear transfer characteristic of the modulating elements used in the first modulator. The second modulator generates the second harmonic of the applied or base band signal. These harmonics are combined with the harmonics in the output of the first modulator to produce a cancellation of the base band second harmonic in the output signal.

Other and incidental objects of the present invention will be apparent from a reading of this specification and an inspection of the accompanying drawing in which.

Figure 1:
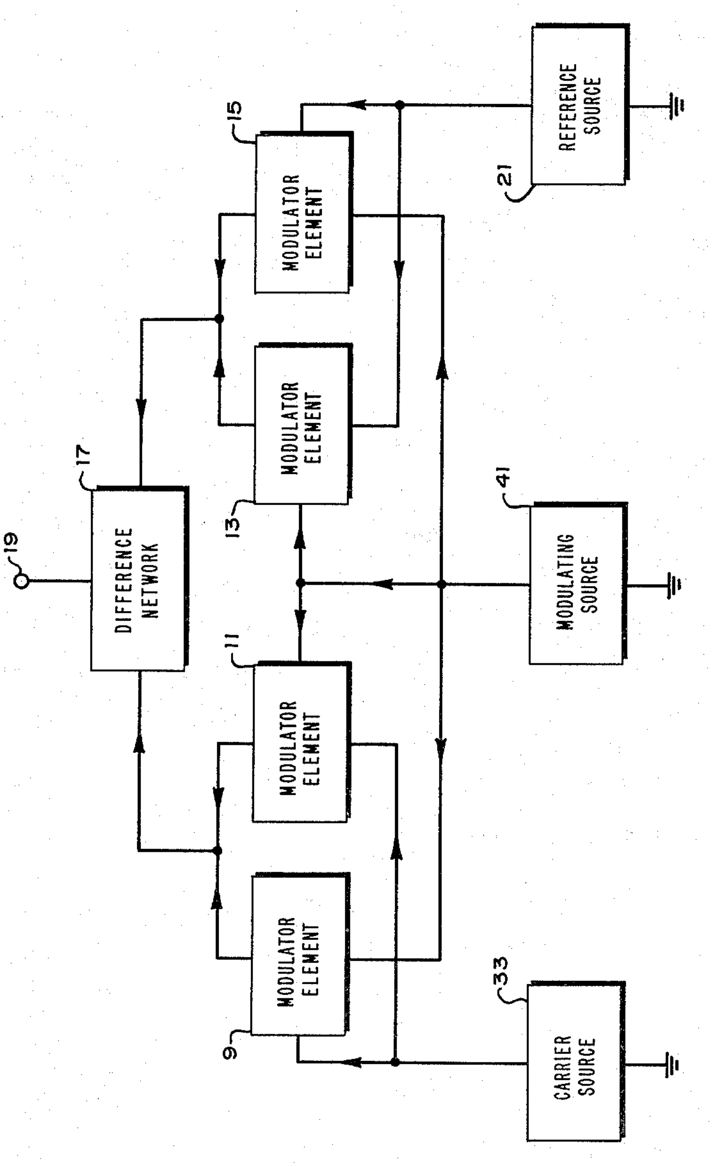
FIGURE 1 is a simplified block diagram of the modulator.

Referring now to FIGURE 1, there is shown a plurality of modulator elements 9, 11, 13 and 15. Each of these elements has a non-linear transfer function which has a second order coefficient in its power series representation. The modulator elements 9 and 11 generate the sum and difference frequencies of the carrier and modulating signals. In addition they generate large second harmonics of the modulating signal from modulating source 41 and of the carrier signal from carrier source 33 because of this second-order coefficient. The second harmonic of carrier signal is sufficiently high in frequency to be readily distinguishable from other frequencies of the system. Carrier signal second harmonic can thus be filtered out easily. The second harmonic of the modulating signal may present a problem in a broadband system where the frequencies of the carrier and modulating signals are closely related. In that situation, the second harmonic of the modulating signal falls within the desired modulation spectrum of the system and thus cannot be filtered out. The second set of modulator elements 13 and 15 eliminate this problem by generating the second harmonic of the modulating signal by means of the second-order coefficient of the non-linear transfer function of each of the modulating elements.

The modulator elements 13 and 15 may also produce the second harmonic of a reference signal for cancellation of undesirable frequency components in the output of the modulating elements 9 and 11. This is achieved by applying to each of the modulator elements 13 and 15 a signal from reference source 21 having a frequency that is related to the frequency of the undesirable component to be cancelled. In certain applications of the present invention the reference source may be ground.

The second harmonics produced by modulator elements 13 and 15 are combined with the output of modulator elements 9 and 11 in difference network 17. The outputs of each of the sets of modulator elements are combined in phase opposition by difference network 17. The output signal appearing at terminal 19 is substantially free not only of the fundamental components of the carrier and modulating signals but also of the second harmonic of the modulating signal.

Figure 2:
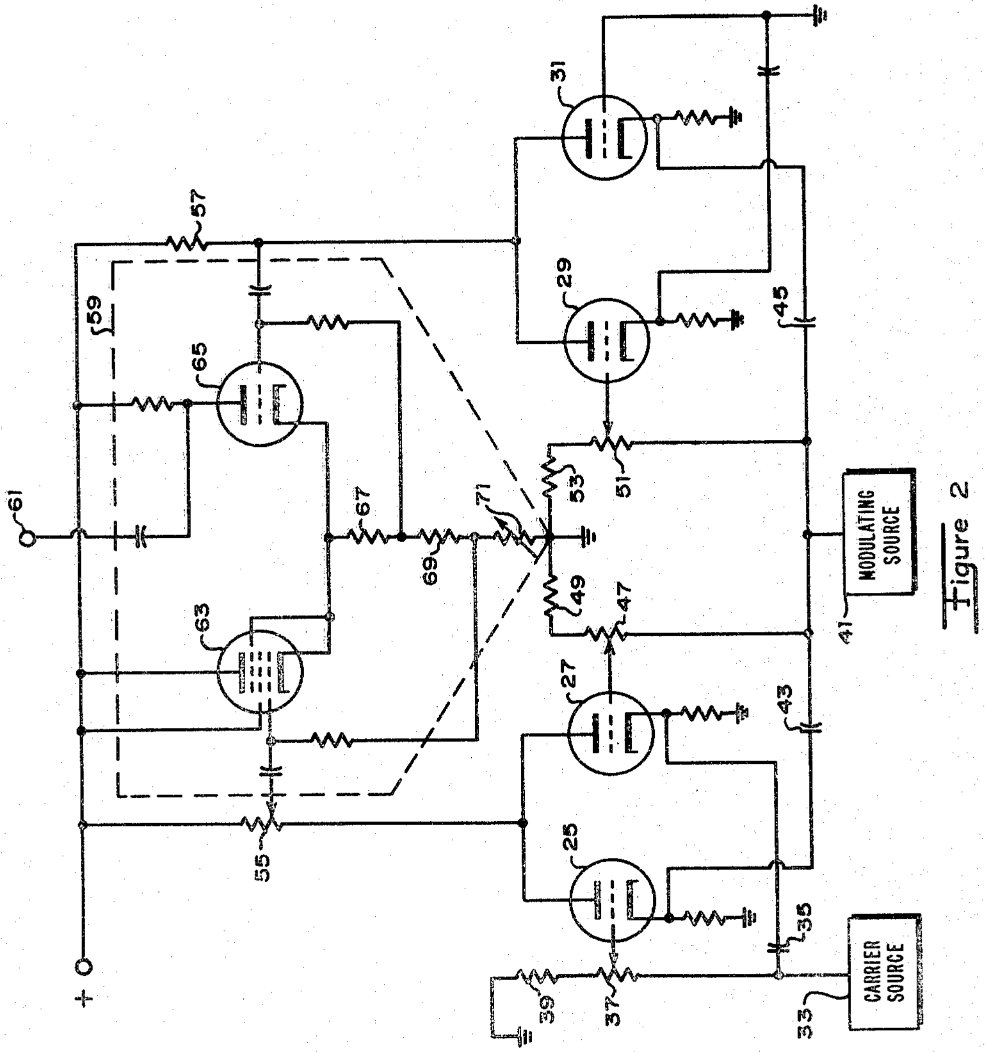
FIGURE 2 is a schematic diagram of the modulator of FIGURE 1.

Referring now to the schematic diagram of FIGURE 2, four triodes 25, 27, 29 and 31 are shown used as modulator elements. The signal from carrier source 33 is applied to the cathode of triode 27 through capacitor 35 and is applied to the grid of triode 25 through the voltage divider comprising resistors 37 and 39. The signal from the modulating source 41 is applied to the cathodes of triodes 25 and 31 through capacitors 43 and 45, respectively, and is applied to the grids of triodes 27 and 29 through the voltage dividers comprising resistors 47 and 49 and comprising resistors 51 and 53, respectively. The grid of triode 31 and the cathode of triode 29 are connected to the reference or ground potential. The plate currents of triodes 25 and 27 combine in resistor 55 and the plate currents of triodes 29 and 31 combine in resistor 57. Difference network 59, to be described in detail later, combines the signals produced by the pairs of triodes in phase opposition to produce an output signal at terminal 61. The four triodes 25 through 31 are biased to maximize the second-order coefficient in the power series representing the non-linear relationship of the plate current to the grid voltage. The current flowing in resistor 55 for tubes connected in this manner thus contains only the even-order terms resulting from the second order coefficient of the power series and includes the sum and difference frequencies of the carrier and modulating signals and the second harmonic components of each of these signals. The fundamental components of the carrier and modulating signals thus are cancelled out. The current flowing in resistor 57 contains the even-order terms resulting from the second-order coefficient of the power series and includes only the second harmonic of the modulating signal. The signals produced by currents flowing in each of resistors 55 and 57 are combined in phase opposition by difference network 59. The output signal appearing at terminal 61 thus contains predominant signals at the sum and difference frequencies of the carrier and modulating signals and at the second harmonic of the carrier signal. The carrier magnitude is balanced by adjusting resistor 37 and the second harmonics are balanced by adjusting resistor 55. The fundamental component of the modulating signal in each of the triode pairs are balanced by adjusting resistors 47 and 51.

The difference network 59 comprises two tubes 63 and 65 having unequal parameters. The cathodes of the tubes are connected together and are connected to ground through serially connected resistors 67, 69 and 71. If one tube is a pentode having large plate resistance, the total cathode resistance of the serially connected resistors 67, 69 and 71 may be determined for balanced operation approximately as the ratio of the amplification factor of the triode 65 to the transconductance parameter of the pentode 63. Adjustable resistors 71 provides a fine control of the balance adjustment to ensure that no output signal is produced when equal and in-phase signals are applied to the grids of tubes 63 and 65.

The circuit of the present invention thus operates over a broad band of frequencies to produce the sum and difference frequencies of applied carrier and modulating signals. The undesirable and unfilterable second harmonic of modulating signal is removed from the output signal of the present invention by combining the second harmonic signals produced by each of similar modulators in phase opposition. This cancellation of the undesirable second harmonic component is achieved without affecting the desirable sum and difference frequencies. In addition, the present invention makes use of any type of modulating element which has at least a second-order coefficient in the power series representing the transfer function of the input to output signal for such element.

I claim:

1. A modulator circuit comprising: first, second, third and fourth modulator elements, each having a non-linear transfer function which represents the relationship between the output and applied signals, the power series representation of said transfer function including a term having a second-order coefficient, a source of modulating signal and a source of carrier signal, a reference signal, means to apply to the first modulator element the combination of the modulating signal and the carrier signal, means to apply to the second modulator element the combination of the modulating signal and the carrier signal, means to apply to the third modulator element the combination of the reference signal and the modulating signal, means to apply to the fourth modulator element the combination of the reference signal and the modulating signal, means to produce a first signal as the combination of the outputs of the first and second modulator elements, means to produce a second signal as the combination of the outputs of the third and fourth modulator elements, and means to produce an output signal as the combination between the first and second signals.

2. A modulator circuit comprising: first, second, third and fourth modulator elements, each having a non-linear transfer function which represents the relationship between the output and applied signals, the power series representation of said transfer function including a term having a second-order coefficient, a source of modulating signal and a source of carrier signal, a source of potential, means to apply to the first modulator element the sum of the modulating signal and the carrier signal, means to apply to the second modulator element the sum of the modulating signal and the carrier signal, means to apply to the third modulator element the sum of said potential and the modulating signal, means to apply to the fourth modulating element the sum of said potential and the modulating signal, means to produce a first signal as the sum of the output currents of the third and fourth modulating elements, means to produce a second signal as the sum of the output currents of the third and fourth modulating elements, and means to produce an output signal as the difference between the first and second signals.

3. A modulator circuit comprising: first, second, third and fourth modulating elements, each producing an output current having at least a component related to the second harmonic of the applied signal voltage, a source of modulating signal and a source of carrier signal, a reference source, means to apply to the first modulating element the sum of the modulating signal and the carrier signal, means to apply to the second modulating element the sum of the modulating signal and the carrier signal, means to apply to the third modulating element the sum of the reference source and the modulating signal, means to apply to the fourth modulating element the sum of the reference source and the modulating signal, means to produce a first signal as the sum of the output currents of the first and second modulating elements, means to produce a second signal as the sum of the output currents of the third and fourth modulating elements, and means to produce an output signal as the difference between the first and second signals.

4. A modulator circuit comprising first, second, third and fourth amplifiers, each having first and second inputs and an output and each being adapted to amplify negatively signals applied to the first input and to amplify positively signals applied to the second input, a source of modulating signal, a source of carrier signal, means to apply said carrier signal to one of said inputs of the first amplifier and to the other of said inputs of the second amplifier, means to maintain constant the signal applied to said one of the inputs of the fourth amplifier and to said other input of the third amplifier, means to apply the modulating signal to the remaining inputs of the first, second, third and fourth amplifiers, means forming a first signal as the sum of the outputs of the first and second amplifiers, means forming a second signal as the sum of the outputs of the third and fourth amplifiers, and means forming an output signal as the difference between said first and second signals.

5. A modulator circuit comprising first, second, third and fourth amplifiers, each having first and second inputs and an output and each being adapted to amplify negatively signals applied to the first input and to amplify positively signals applied to the second input, a source of modulating signal, a source of carrier signal, means to apply said carrier signal to the first input of the first amplifier and to the second input of the second amplifier, a source of reference potential, means connecting the first input of the fourth amplifier to said source of reference potential, means connecting the second input of the third amplifier to said source of reference potential, means to apply the modulating signal to the remaining inputs of the first, second, third and fourth amplifiers, means forming a first signal as the sum of the outputs of the first and second amplifiers, means forming a second signal as the sum of the outputs of the third and fourth amplifiers, and means forming an output signal as the difference between said first and second signals.

6. A modulator circuit comprising first, second, third and fourth amplifiers, each having first and second inputs and an output and each being adapted to amplify negatively signals applied to the first input and to amplify positively signals applied to the second input, biasing means for each of said amplifiers, a source of modulating signal, a source of carrier signal, means to apply said carrier signal to the first input of the first amplifier and to the second input of the second amplifier, a source of reference potential, means connecting the first input of the fourth amplifier and the second input of the third amplifier to said source of reference potential, means to apply the modulating signal to the remaining inputs of the first, second, third and fourth amplifiers, means forming a first signal as the sum of the outputs of the first and second amplifiers, means forming a second signal as the sum of the outputs of the third and fourth amplifiers, and a difference amplifier forming an output signal as the difference between said first and second signals.

7. A modulator circuit comprising first, second, third, fourth, fifth and sixth electron tubes, each having at least plate, grid and cathode elements, a source of modulating signal, a source of carrier signal, means connecting said grid electrode of the first electron tube and the cathode electrode of the second electron tube to said source of carrier signal, a source of reference potential, means connecting said grid electrode of the fourth electron tube and said cathode electrode of the third electron to said source of reference potential, means connecting the remaining grid and cathode electrodes of the first, second, third and fourth electron tubes to said source of modulating signal, means to produce a first signal as the sum of the plate currents of the first and second electron tubes, means to produce a second signal as the sum of the plate currents of the third and fourth electron tubes, means to apply the first and second signals to the grid electrodes of the fifth and sixth electron tubes, respectively, the fifth and sixth electron tubes having dissimilar circuit parameters, the cathode electrodes of the fifth and sixth electron tubes being connected together and being connected to said source of reference potential through an impedance, and means responsive to the plate current in the one of the fifth and sixth electron tubes having the lowest plate resistance parameter to produce an output signal.

References Cited by the Examiner

UNITED STATES PATENTS

| | | | |
|---|---|---|---|
| 2,186,958 | 1/40 | Collins | 332—44 X |
| 2,857,511 | 10/58 | Tongue | 332—44 X |

ROY LAKE, *Primary Examiner.*

ALFRED L. BRODY, *Examiner.*

UNITED STATES PATENT OFFICE
CERTIFICATE OF CORRECTION

Patent No. 3,175,170 March 23, 1965

John P. Van Duyne

It is hereby certified that error appears in the above numbered patent requiring correction and that the said Letters Patent should read as corrected below.

Column 4, line 4, for "third and fourth" read -- first and second --.

Signed and sealed this 15th day of February 1966.

(SEAL)
Attest:

ERNEST W. SWIDER
Attesting Officer

EDWARD J. BRENNER
Commissioner of Patents